(12) United States Patent
Tsai et al.

(10) Patent No.: US 8,749,558 B2
(45) Date of Patent: Jun. 10, 2014

(54) METHOD FOR DISPLAYING DISPLACEMENT OF OBJECT ON DISPLAY OF ELECTRONIC DEVICE

(75) Inventors: Hong-Yang Tsai, Taipei (TW); Ko-Min Hsueh, Taipei (TW)

(73) Assignee: Esobi Inc., George Town (KY)

( * ) Notice: Subject to any disclaimer, the term of this patent is extended or adjusted under 35 U.S.C. 154(b) by 614 days.

(21) Appl. No.: 13/025,354

(22) Filed: Feb. 11, 2011

(65) Prior Publication Data
US 2011/0202860 A1  Aug. 18, 2011

(30) Foreign Application Priority Data

Feb. 12, 2010  (TW) ................................ 99104721 A

(51) Int. Cl.
*G06T 13/00*  (2011.01)
(52) U.S. Cl.
USPC ........... 345/473; 345/421; 345/427; 345/619; 715/225; 715/769
(58) Field of Classification Search
CPC ......... G06T 13/00; G06T 13/20; G06T 13/80; G06T 15/00; G06T 19/00
USPC .......... 345/421, 427, 440, 473, 619, 421.427; 715/255, 769, 779
See application file for complete search history.

(56) References Cited

U.S. PATENT DOCUMENTS

| | | | | |
|---|---|---|---|---|
| 4,918,435 A | * | 4/1990 | Ryouki et al. | 345/24 |
| 5,831,627 A | * | 11/1998 | Cohen | 345/592 |
| 5,880,743 A | * | 3/1999 | Moran et al. | 345/473 |
| 5,969,721 A | * | 10/1999 | Chen et al. | 345/419 |
| 5,991,883 A | * | 11/1999 | Atkinson | 713/300 |
| 7,453,479 B2 | * | 11/2008 | Le et al. | 345/698 |
| 8,525,839 B2 | * | 9/2013 | Chaudhri | 345/473 |
| 8,531,465 B2 | * | 9/2013 | Platzer et al. | 345/473 |
| 8,539,385 B2 | * | 9/2013 | Capela et al. | 715/863 |
| 2011/0078560 A1 | * | 3/2011 | Weeldreyer et al. | 715/255 |
| 2011/0109635 A1 | * | 5/2011 | Platzer et al. | 345/473 |
| 2011/0141120 A1 | * | 6/2011 | Platzer et al. | 345/473 |
| 2011/0164042 A1 | * | 7/2011 | Chaudhri | 345/473 |

FOREIGN PATENT DOCUMENTS

TW  200917056 A  4/2009

OTHER PUBLICATIONS

Communication From the Taiwan Patent Office Regarding a Counter-Part Foreign Application Date (Taiwan Year 102) Nov. 21, 2013.

* cited by examiner

*Primary Examiner* — Kimbinh T Nguyen
(74) *Attorney, Agent, or Firm* — Rosenberg, Klein & Lee

(57) ABSTRACT

The method for displaying according to the present invention is used for displaying the displacement of an object (group) on the display of an electronic device. The method calculates an animation interval according to an amount of animation and an animation time; calculates an animation end time according to the animation interval and the order of animation to be executed; calculates a distribution ratio according to the animation end time and a distribution curve; calculates a displacement according to the distribution ratio and an animation execution distance; calculates an updated coordinate according to the displacement after the object (group) is moved; and replots the displaced object (group) in the display window of the display of the electronic device according to the updated coordinate. By calculating the displacement of each step of animation during the animation process, the present invention can present the process of object (group) movement. Thereby, when the object (group) is moving, the animated displaying effects with speed variations can be exhibited.

12 Claims, 9 Drawing Sheets

METHOD FOR DISPLAYING DISPLACEMENT OF OBJECT ON DISPLAY OF ELECTRONIC DEVICE

FIELD OF THE INVENTION

The present invention relates generally to a method for displaying, and particularly to a method for displaying the displacement of an object on the display of an electronic device.

BACKGROUND OF THE INVENTION

In recent years, with the fast advancement of technologies, various electronic devices, in particular mobile devices such as notebook computers, cellular phones, personal digital assistants (PDAs), and personal multimedia players, are developed rapidly and hence substantially enhancing people's convenience in daily lives. Because earlier electronic devices emphasized on their functionality, the appearance of their pictures are generally monotonous. Nonetheless, people's demands increase day by day. In addition to comprehensive functions, they also request for novel and varied displays. Accordingly, current electronic devices can exhibit many functional options or image functions such cursor operations. Moreover, they can even provide animated effects, for example, the effects of cursor animation or of dynamic menus.

For easier operations of electronic devices, the displays of most of present electronic devices are touch panels, which enables direct selection of menus on the displays by simply using an indicator, such as a finger or a stylus, and then executing the corresponding functions. Thereby, people need not select by means of the buttons of electronic devices, and hence improving convenience while using electronic devices. Besides, people can further interact with electronic devices via touch-panel displays. For example, people can drag directly an object displayed (such as an object of data item) and move it. After dragging, an animation can be formed for exhibiting dynamic visual effects, which are distinct from static presentations.

Modern electronic devices can further display animation with different speed and thus enhancing dynamic effects. For instance, people can drag an object displayed and release it. Then the object can maintain moving and form an animation with varying moving speeds (for example, from fast to slow or vice versa) for presenting dynamic animated effect having varying speeds on the display. The methods for adjusting the moving speed of animations according to prior art mostly adopt the method of adjusting the speed, such as adjusting the speed by using a parabolic curve equation. However, it is difficult to control the moved distance of an object by using this adjusting method. Consequently, an object tends to move exceeding the display range of the display window on the display, leading to incomplete display of the object and hence affecting the animated effects.

Accordingly, the present invention provides a method for displaying the displacement of an object on the display of an electronic device for solving the problems described above. According to the present invention, in addition to exhibiting animated effects having speed changes while an object (group) is moving, the drawback of inability to position correctly an object in a display window according to the prior art is also improved. Thereby, the animated effects are enhanced, and the above-mentioned problems are solved.

SUMMARY

An objective of the present invention is to exhibit animated displaying effects when an object (group) moves on the (touch-panel) display of an electronic device.

Another objective of the present invention is to position correctly an object at a new location and to display the object in a display window of a touch-panel display when an object (group) moves on the (touch-panel) display of an electronic device.

The method for displaying the displacement of an object on the display of an electronic device according to the present invention comprises the following steps. (A) Read the hardware database of the electronic device, and acquire and display a plurality of objects (groups) of data item in a set display window on the display of the electronic device. (B) Calculate the dragging speed at which a user drags the object (group) of data item when the user drags any of the plurality of objects (groups) of data item in the display window. (C) Set an animation time, and calculate an animation execution distance according to the dragging speed and the animation time. (D) Set an amount of animation; distribute the amount of animation evenly to the animation time; and calculate an animation interval. (E) Calculate an animation end time according to the animation interval and the order of animation execution. (F) Calculate a distribution ratio according to the animation end time and a distribution curve. (G) Calculate a displacement of the order of animation execution according to the distribution ratio and the animation execution distance. (H) Calculate an updated coordinate after the plurality of objects (groups) of data item are displaced according to the displacement, and replot the displaced plurality of objects (groups) of data item in the display window according the updated coordinate. (I) Repeat the steps (E) to (I) until the order of animation execution is equal to the amount of animation. Then the process of displaying animations is completed.

Thereby, according to the method of the present invention, the plurality of objects (groups) of data item can exhibit animated displaying effects having varying speeds while they are moving in the display window. In addition, the present invention controls the speed variations of animations according to the execution distance of each step of animation during animation execution process. Consequently, the speed variations of animations can be easily controlled. The plurality of objects (groups) of data item can be positioned at the new location and be displayed completely when they are moved on the display of the electronic device.

The step (A) according to the method of the present invention comprises the following steps. (A1) Calculate the maximum displaying range of the display window of the display according to the resolution of the display of the electronic device. (A2) Calculate the holding height of each of the objects (groups) of data item according to the maximum displaying range. (A3) Calculate a plurality of coordinates of the plurality of objects (groups) of data items according to the holding height. (A4) Plot the plurality of objects (groups) of data item in the display window according to the plurality of coordinates. Besides, the step (A2) described above further comprises the following steps. (A21) Calculate an initial position of a first object (group) of data item in the display window according to the maximum displaying range of the display window. (A22) Set an initial coordinate of the first object (group) of data item as the initial position. Moreover, the step (A3) described above further comprises a step (A31), which is to calculate a plurality of coordinates of the rest of the plurality of objects (groups) of data item according to the initial position of the first object (group) of data item in the displaying window and the holding height. According to the present invention, by means of positioning the first object (group) of data item at the initial position as well as calculating the holding height of each of the plurality of objects (groups) of data item according to the maximum displaying range of the display window, the plurality of objects (groups) of data item can be displayed completely to the maximum displaying range of the display window.

The present invention further provides a method for displaying, which used for displaying displacement animations of at least a toolbar object (group), and comprises the following steps. (A) Read the hardware database of the electronic device, and acquire and display the toolbar object (group) to be displayed in a set display window on the display of the electronic device. (B) Set an animation time and an animation execution distance. (C) Set an amount of animation; distribute the amount of animation evenly to the animation time; and calculate an animation interval. (D) Calculate an animation end time according to the animation interval and the order of animation execution. (E) Calculate a distribution ratio according to the animation end time and a distribution curve. (F) Calculate a displacement of the order of animation execution according to the distribution ratio and the animation execution distance. (G) Calculate an updated coordinate after the toolbar object (group) is displaced according to the displacement, and replot the displaced toolbar object (group) in the display window according the updated coordinate. (H) Repeat the steps (D) to (H) until the order of animation execution is equal to the amount of animation. Then the process of displaying displacement animations of toolbar object (group) is completed.

Besides, the step (A) according to the method further comprises the following steps. (A1) Calculate the maximum displaying range of the display window of the display according to the resolution of the display of the electronic device. (A2) Calculate the holding length of the toolbar object (group) according to the maximum displaying range of the display window. (A3) Set an initial coordinate of the toolbar object (group). (A4) Plot the toolbar object (group) in the display window according to the initial coordinate. Moreover, the step (A2) described above further comprises a step (A21), which is to calculate an initial position of the toolbar object (group) in the display window according to the maximum displaying range of the display window. The step (A3) described above further comprises a step (A31) to set the initial coordinate of the toolbar object (group) as the initial position.

DETAILED DESCRIPTION

In order to make the structure and characteristics as well as the effectiveness of the present invention to be further understood and recognized, the detailed description of the present invention is provided as follows along with embodiments and accompanying figures.

The method for displaying according to the present invention is mainly applied to electronic devices. By using the present invention, animated displaying effects with varying speeds can be exhibited when the objects (groups) on the display of the electronic devices are moved. In the following, the method for displaying according to the present invention is described in details with embodiments.

Figure 1:
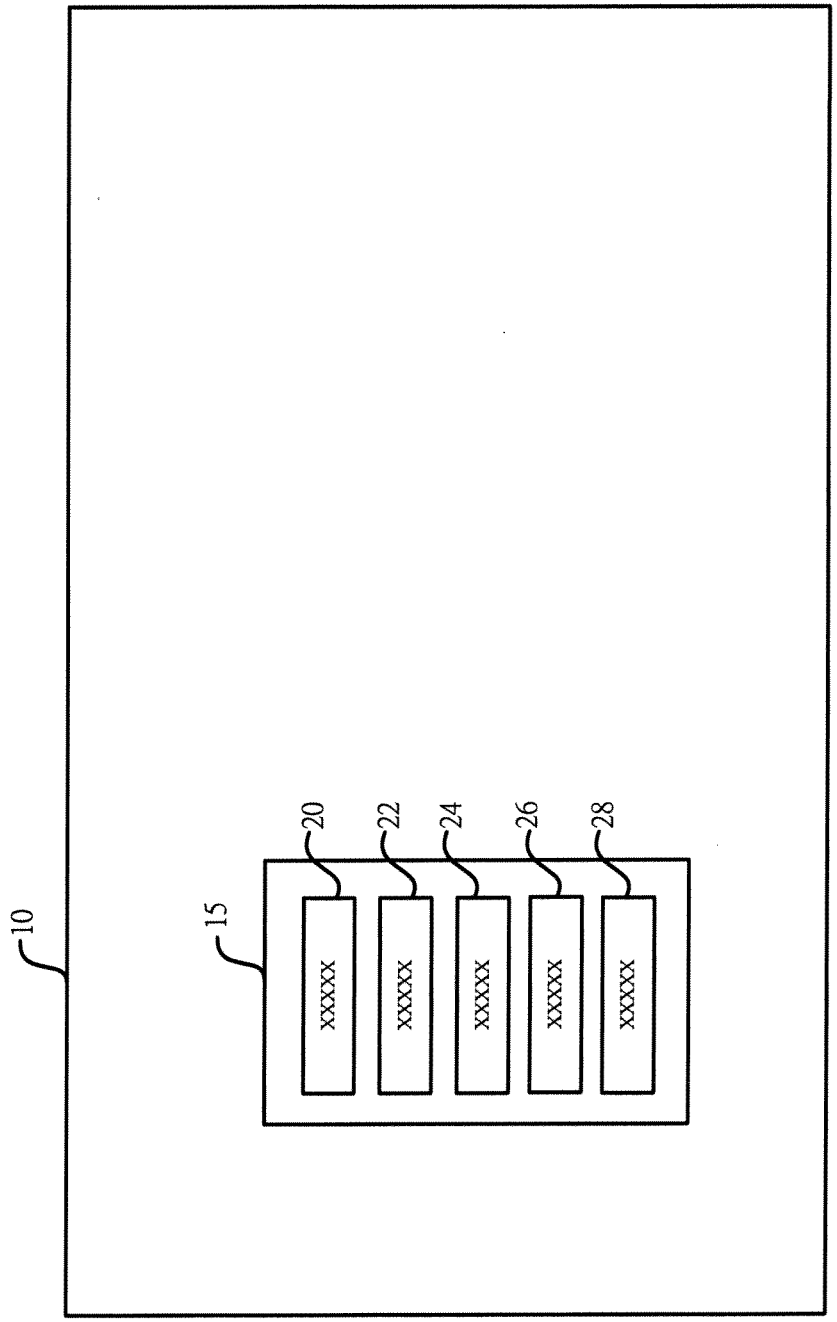
FIG. 1 shows a schematic diagram of a display and a display window of an electronic device according to a preferred embodiment of the present invention.
Figure 2:
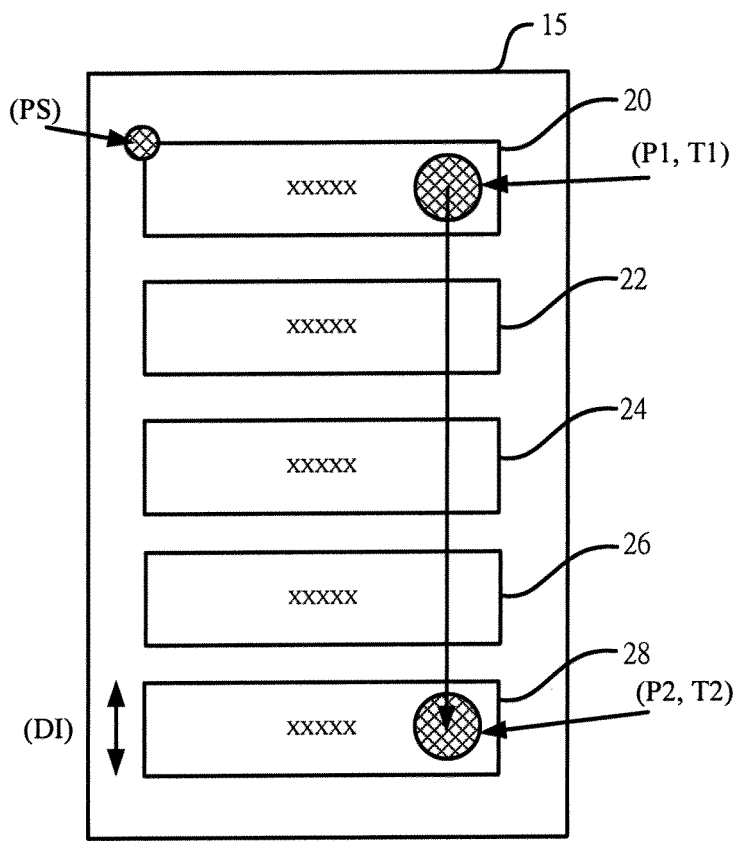
FIG. 2 shows a schematic diagram of objects (groups) of data item displayed in a display window according to a preferred embodiment of the present invention.

FIG. 1 shows a schematic diagram of a display and a display window of an electronic device according to a preferred embodiment of the present invention. As shown in the figure, the electronic device applied in the present invention comprises a display 10, which has at least a display window 15. The present embodiment has only a single display window 10. However, the display 10 of the present invention is not limited to having a single display window. Its quantity depends on design requirements. In addition, the display 10 according to the present invention is a touch-panel display. The display window 15 is used for displaying a plurality of objects (groups) of data item. As shown in FIG. 1 and FIG. 2, the display window 15 according to the present embodiment can display five objects (groups) of data item 20, 22, 24, 26, 28. The contents of the plurality of objects (groups) of data item 20, 22, 24, 26, 28 are texts, such as news, weather, and stock trends, for a user of the electronic device.

FIG. 2 shows a schematic diagram of objects (groups) of data item displayed in a display window according to a preferred embodiment of the present invention. Because the display 10 (refer to FIG. 1) of the present invention is a touch-panel display, the user can drag any of the plurality of objects (groups) of data item 20, 22, 24, 26, 28 using an indicator such as a finger or a stylus, for scrolling the plurality of objects (groups) of data item 20, 22, 24, 26, 28 and showing other objects (groups) of data item in the display window 15. For instance, if the user, as shown in FIG. 2, drags the first object (group) of data item in the display window 15 and moves it downwards, the plurality of objects (groups) of data item 20, 22, 24, 26, 28 in the display window 15 will be scrolled downwards and other objects (groups) of data item not shown originally will appear in the display window 15 for the user.

When the user drags the first object (group) of data item downwards and releases it, the plurality of objects (groups) of data item 20, 22, 24, 26, 28 will be scrolled downwards for showing other objects (groups) of data item originally not appeared in the display window 15. During the process of scrolling the plurality of objects (groups) of data item 20, 22, 24, 26, 28 downwards described above, animations will be produced. When the plurality of objects (groups) of data item 20, 22, 24, 26, 28 move, the present invention will display animations with varying speeds for exhibiting animations with speed variations. In what follows, the method for display according to the present invention will be described in details with FIGS. 2 and 3.

Figure 3:
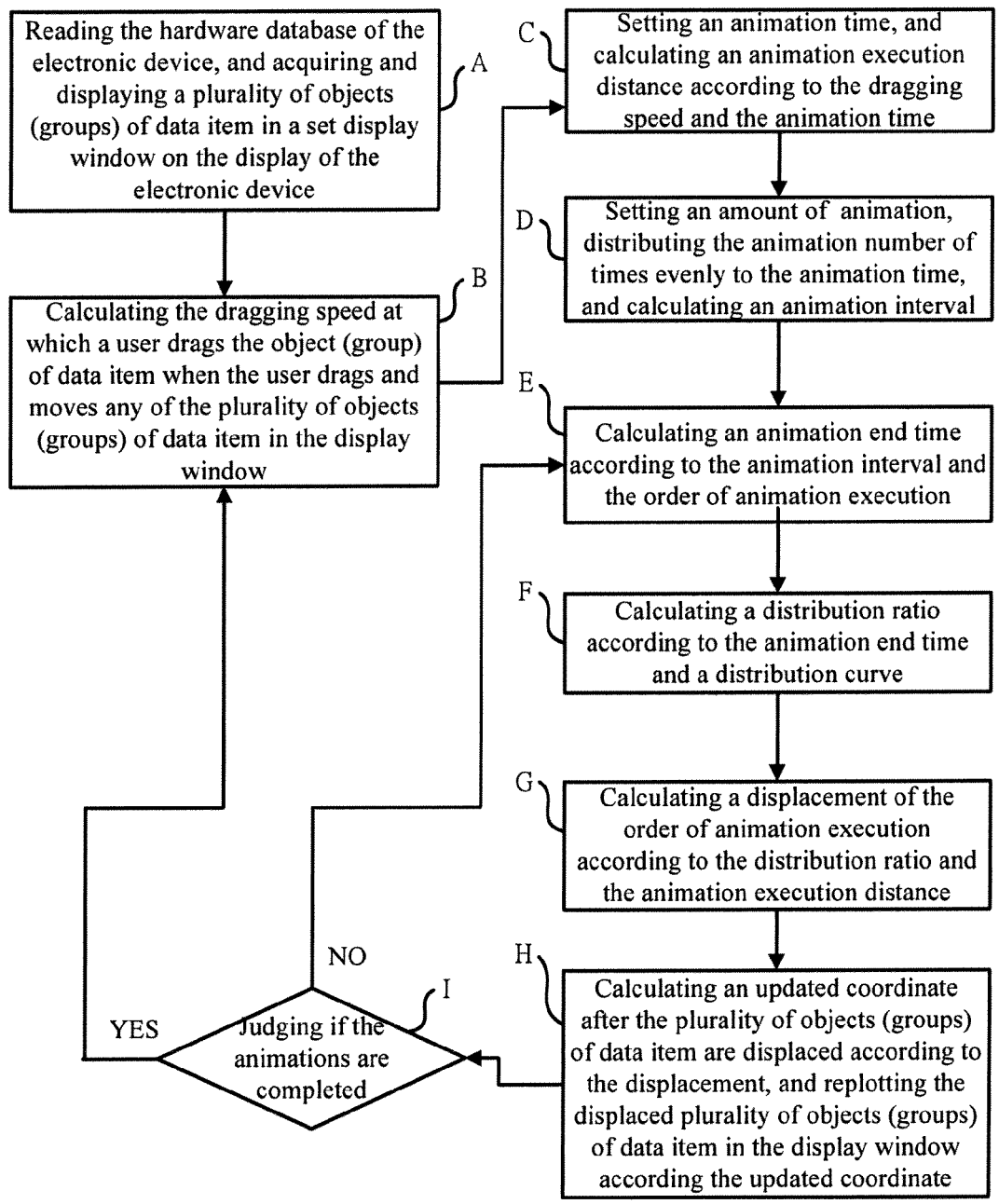
FIGS. 3 to 8 show flowcharts according to a preferred embodiment of the present invention.
Figure 4:
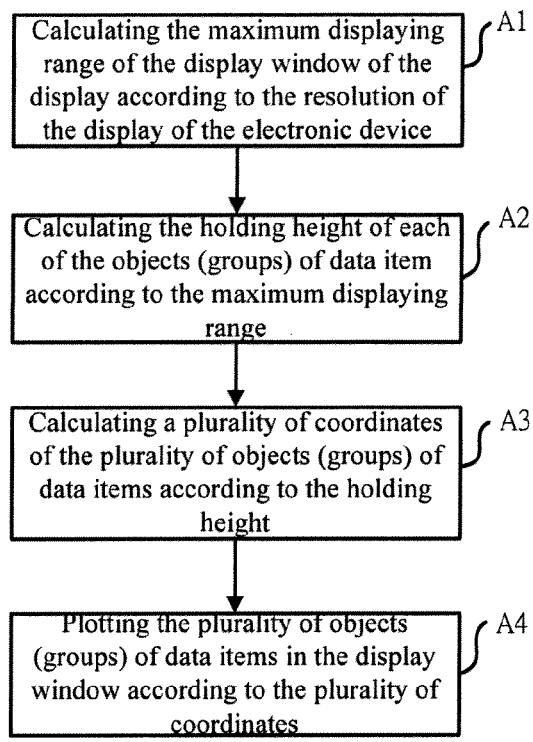

FIG. 3 shows a flowchart according to a preferred embodiment of the present invention. Firstly, a step (A) is executed for reading the hardware database (not shown in the figure) of the electronic device, and acquiring and displaying the plurality of objects (groups) of data item, which include the objects (groups) of data item 20, 22, 24, 26, 28 shown in FIG. 2, in the set display window 15 on the display 10 of the electronic device. The detailed flowchart of this step (A) is shown in FIG. 4, and will be described in more details later.

As shown in the step (B) in FIG. 3, when the user operates the electronic device and drags and moves any of the plurality of objects (groups) of data item 20, 22, 24, 26, 28 in the display window 15 of the display 10, the present invention will calculate the dragging speed at which the user drags the object (group) of data item. In this step, when the user drags and moves any of the plurality of objects (groups) of data item 20, 22, 24, 26, 28 in the display window 15, the operating system of the electronic device will launch an operating message meaning that the user is operating the display window 15. The operating system launches this operating message corresponding to the operating status in which the user is operating the display window 15. The operating system then notifies that the user is dragging and moving the plurality of objects (groups) of data item 20, 22, 24, 26, 28 for calculating the dragging speed.

Figure 7:
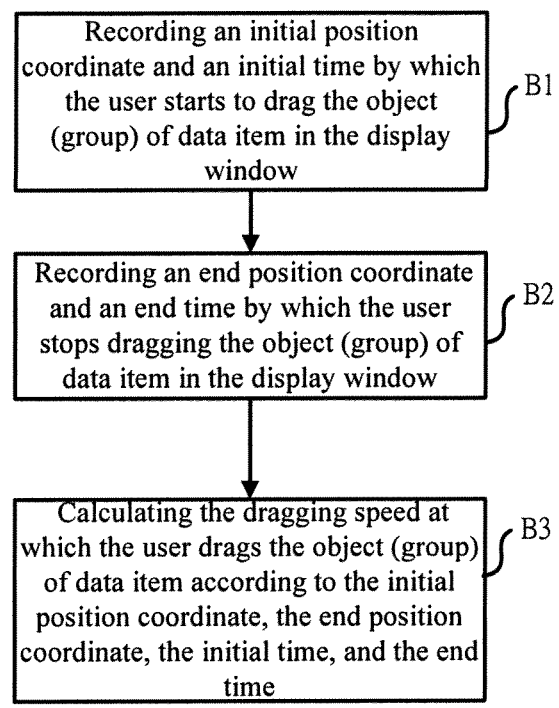

The detailed process if calculating the dragging speed in the step (B) described above is shown in FIG. 7. In the following, FIG. 2 and FIG. 7 are used for describing the process of calculating the dragging speed according to the present invention in details. As shown in FIG. 2, according to the present embodiment, the user drags the first object (group) of data item 20 shown in the display window 15 downwards and releases it. Because in the present embodiment, the user drags the first object (group) of data item 20, in the following description, the operation of dragging the first object (group) of data item will be adopted. However, it does not mean that the user can only drag the first object (group) of data item 20. According to the present invention, the method for calculating the dragging speed comprises the following steps. First, a step (B1) is executed for recording an initial position coordinate P1 and an initial time T1 by which the user starts to drag the first object (group) of data item 20 in the display window 15 of the display 10. Then, a step (B2) is executed for recording an end position coordinate P2 and an end time T2 by which the user stops dragging the first object (group) of data item 20 in the display window 15 of the display 10. Next, as shown in the step (B3), calculate the dragging speed V1 at which the user drags the first object (group) of data item 20 according to the initial position coordinate P1, the end position coordinate P2, the initial time T1, and the end time T2. Thereby, the dragging speed V1 at which the user drags the first object (group) of data item 20 can be calculated. The dragging speed V1 is calculated according to the equation shown below:

$$\text{dragging speed } V1 = (\text{end position coordinate } P2 - \text{initial position coordinate } P1)/(\text{end time } T2 - \text{initial time } T1)$$

After the dragging speed V1 is calculated according to the step (B) described above, a step (C) is executed for setting an animation time TA and calculating an animation execution distance DA according to the dragging speed V1 and said animation time TA. This step (C) is to calculate the total distance by which the plurality of objects (groups) of data item is displaced during the process of animation execution. According to the present invention, the animation time can be set, and thereby the product of the dragging speed V1 and the animation time TA is the animation execution distance DA as shown below:

$$\text{animation execution distance } DA = \text{dragging speed } V1 * \text{animation time } TA$$

After the step (C) described above is completed for calculating the animation execution distance DA, a step (D) is subsequently executed for setting an amount of animation TN, distributing the amount of animation TN evenly to the animation time TA, and calculating an animation interval TS, which is calculated according to the following equation:

$$\text{animation interval } TS = \text{animation time } TA/\text{amount of animation } TN$$

As shown in the above equation, this step (D) is to calculate the time for executing each step of animation during the whole animation process. That is to say, the animation time TA is distributed evenly to each step of animation, and hence the time for executing each step of animation will be identical. For example, if the amount of animation TN is set to be 19 and the animation time TA is 3 seconds, then the times for executing the first, the second till the tenth step of animation are all 0.3 second.

After the step (D) is executed for calculating the animation interval TS, a step (E) is next executed for calculating an animation end time TDi (i=1~TN) according to the animation interval TS and the order of animation execution, which is to calculate the end time of executing each step of animation such as the first, the second till the tenth step of animation. The animation end time TDi is calculated as the following equation:

$$\text{animation end time } TDi = \text{animation interval } TS * \text{order of animation execution } (1\sim TN)$$

After the animation end time TDi is calculated, a step (F) is executed for calculating a distribution ratio Ri (i=1~TN) according to the animation end time TDi and a distribution curve. For presenting animations with speed variations, the executed displacements for animations of different order differ. For example, if the displacement speeds of animations changes from slow to fast, the displacement of the second step of animation will be greater than that of the first step. In this step, the distribution ratios Ri for animations of different order are calculated according to speed variations. The displacements can be calculated in the next step according to the distribution ratios Ri.

Figure 9:
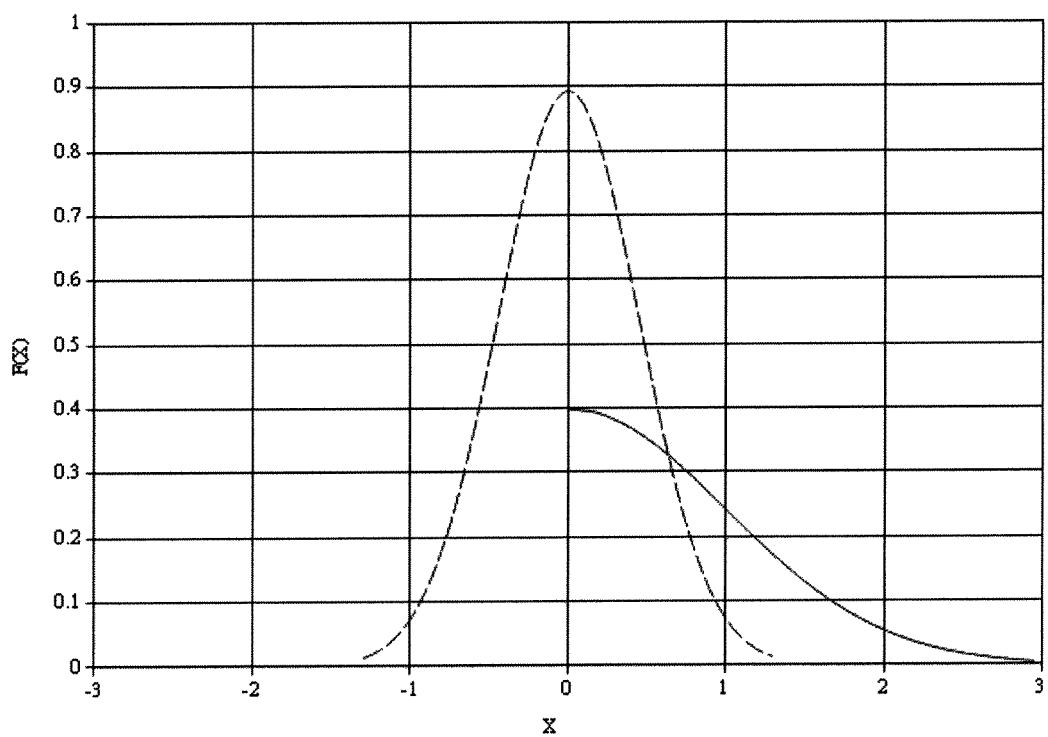
FIG. 9 shows a distribution curve according to a preferred embodiment of the present invention.

The method for calculating the distribution ratio Ri according to the present invention is to integrate to a certain location of the distribution curve for giving the area under the curve corresponding to the location and being the distribution ratio Ri. The sum of the area under the curve is 1. To elaborate, the animation end time TDi is used as the location on the distribution curve and substituted into the integration equation of the curve for calculating the area under the curve corresponding to the location and hence giving the distribution ratio Ri. The distribution curve described above can be a normal distribution curve. The choice of the type of the distribution curve described above depends on the requirements of designing speed variations of the animations. Besides, the integration equation for the area of the curve is different as the distribution curve differs. As shown in FIG. 9, if the speeds of the animations change from slow to fast and to slow, then the first curve shown in dashed line can be adopted. On the other hand, if the speeds change from fast to slow, the second curve in solid line can be used.

After the above step (F) is completed for calculating the distribution ratio Ri, a step (G) is executed for calculating a displacement DAi (i=1~TN) of the order of animation execution according to the distribution ratio Ri and the animation execution distance DA. This step is to calculate the displacement DAi of different order of animation. Namely, the displacement of each animation is calculated. The displacements differ depending on the speeds of the animations. The displacement DAi is calculated according to the following equation:

$$\text{displacement } DAi = \text{distribution ratio } Ri * \text{animation execution distance } DA$$

After the step (G) is completed for calculated the displacement DAi, a step (H) is executed for calculating an updated coordinate after the plurality of objects (groups) of data item are displaced according to the displacement DAi, and replotting the displaced plurality of objects (groups) of data item in the display window 15 according the updated coordinate. This step (H) is to calculate the updated coordinate of the plurality of objects (groups) of data item, namely, the new coordinate of the plurality of objects (groups) of data item, and to judge which objects (groups) of data item are in the display window 15 according to the updated coordinate. Then the plotting function of the operating system is executed and the plurality of objects (groups) of data item are replotted in the display window 15. The plotting function described above is well known to a person having ordinary skill in the art, and hence will not be described in more details.

When the above step (H) is completed, a step of animation, such as the first step of animation, is finished. Afterwards, as shown in the step (I), it is judged if the animations are completed. This step judges if the order the animation execution is equal to the amount of animation TN. According to the present embodiment, the amount of animation TN is set to be 10. Thereby, it is judged if the tenth step of animation is finished. If not, the above steps (E) to (I) are repeated for calculating the animation end time TDi (the step E), the distribution ratio Ri (the step F), the displacement DAi (the step G), and the updated coordinate (the step H) for the next step of animation until the order of animation execution is equal to the amount of animation TN. If it is judged that the animations are completed, the operating system will wait until next time the user drags and moves the objects (groups) of data item in the display window 15 and launch the operating message for performing the method for displaying according to the present invention.

According to the present invention, all of the process steps described above can be executed by the processor of the electronic device. Alternatively, other hardware circuits can be disposed for executing the above process steps. A person having ordinary skill in the art knows that there exist many embodiments for executing the process steps. Thereby, the present invention is not limited to using any hardware circuit for executing the method for displaying according to the present invention.

FIG. 4 shows a detailed flowchart of the step (A) according to the present invention. In the following, this process will be elaborated. The step (A) of displaying the plurality of objects (groups) of data item in the set display window 15 comprises the following steps. First, a step (A1) is executed for calculating the maximum displaying range of the display window 15 of the display 10 according to the resolution of the display 10 of the electronic device. This step is to calculate the maximum displaying range of the display window 15 by firstly calculating the total number of pixels in the display window 15 according to the resolution of the display window 15. Then, a step (A2) is executed for calculating the holding height DI (refer to FIG. 2) of each of the objects (groups) of data item according to the maximum displaying range of the display 15. Thereby, the range of each object (group) of data item, which is the range of each object (group) of data item for displaying its content, in the display window 15 can be defined. As shown in FIG. 2, the holding heights DI of the objects (groups) of data item are identical. According to the present embodiment, five objects (groups) of data item are planned to be displayed in the display window 15. Thereby, the holding height DI of each object (group) of data item is calculated according to the maximum displaying range of the display window 15 for allowing a maximum hold height DI for each object (group) of data item within the limited displaying range and displaying completely in the display window 15.

After finishing the above step (A2) of calculating the holding height DI of each object (group) of data item, a step (A3) is executed for calculate the plurality of coordinates of said plurality of objects (groups) of data items according to the holding height. Afterwards, a step (A4) if executed for plotting the plurality of objects (groups) of data items in the display window 15 according to the plurality of coordinates. This step is to judge which objects (groups) of data item are located in the maximum displaying range of the display window 15 according to the calculated plurality of coordinates, then display them in the display window 15. After the above steps (A1) to (A4) are executed, the objects (groups) 20, 22, 24, 26, 28 are displayed completely in the display window 15, as shown in FIG. 2.

Figure 5:
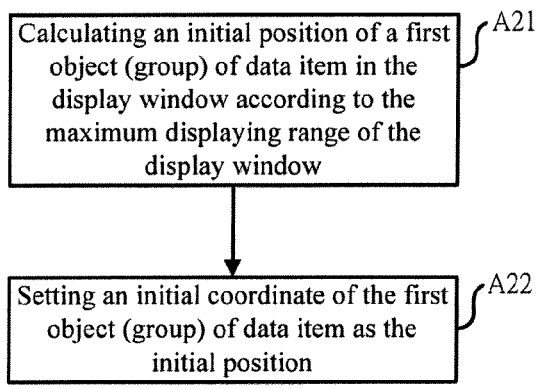

FIG. 5 shows a detailed flowchart of the step (A2) according to the present invention. The step (A2) further comprises steps (A21) and (A22). The step (A21) is to calculate an initial position PS (refer to FIG. 2) of the first object (group) of data item 20 in the display window 15 according to the maximum displaying range of the display window 15. The (A22) then sets an initial coordinate of the first object (group) of data item 20 in the display window 15 as the initial position PS. Thereby, the first object (group) of data item 20 will be displayed at the initial position PS of the display window 15.

Figure 6:
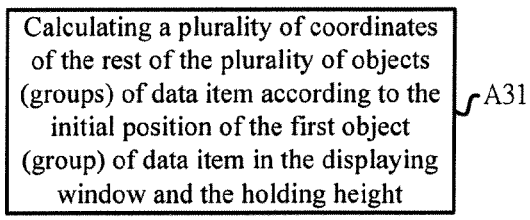

FIG. 6 shows a detailed flowchart of the step (A3) according to the present invention. When the step (A3) in FIG. 4 is executed for calculating the plurality of coordinates of the objects (groups) of data item according to the holding height DI, it further comprises a step (A31) of calculating the plurality of coordinates of the rest of said plurality of objects (groups) of data item according to the initial position PS of the first object (group) of data item 20 in the displaying window 15 and the holding height DI.

Figure 8:
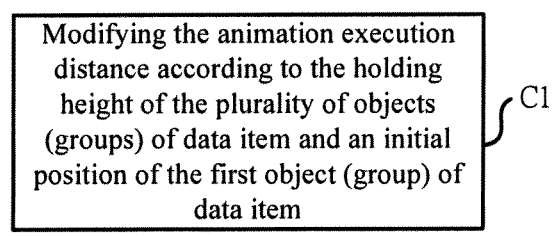

Moreover, for ensuring that the initial coordinate of the first object (group) of data item subsequently displayed in the display window 15 is still the initial position PS after the animations are executed, the step (C) according to the present invention further comprises a step (C1), as shown in FIG. 8. After the animation execution distance DA is calculated according to the step (C), the step (C1) is further executed for modifying the animation execution distance DA according to the holding height DI of the objects (groups) of data item and the initial position PS of the first object (group) of data item. Thereby, it is ensured that the first object (group) of data item subsequently displayed in the display window 15 will still be located at the initial position PS after the animations are executed.

Figure 10:
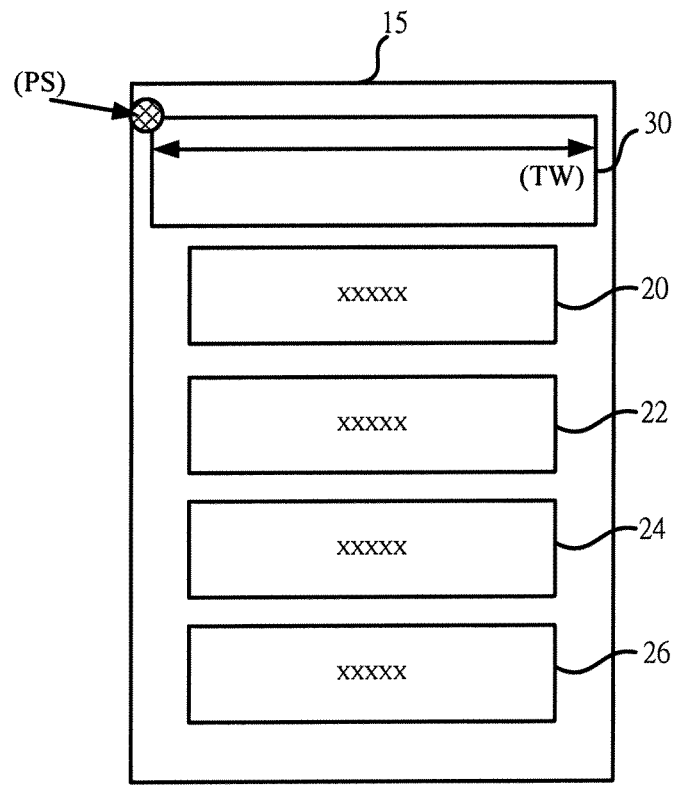
FIG. 10 shows a schematic diagram of a toolbar object (group) displayed in a display window according to another preferred embodiment of the present invention.

In addition to displaying displacement of objects (groups) of data item, the present invention can also be applied to displaying the displacement animations during the hiding process of toolbar objects (groups) on the display 10 of the electronic device. In the following, the method for displaying displacement of toolbar objects (groups) according to the present invention is described with embodiments. In FIG. 10, in addition to the objects (groups) of data item 20, 22, 24, 26, 28, a toolbar object (group) 30 is also displayed in the display window 15. When the toolbar object (group) 30 is hidden, it moves to right of the display window 15. According to the present invention, animations with speed variations can be displayed during the process of displacement of the toolbar object (group) 30. In what follows, FIG. 10 and FIG. 11 are used for elaborating the method for displaying displacement of the toolbar object (group) 30.

Figure 11:
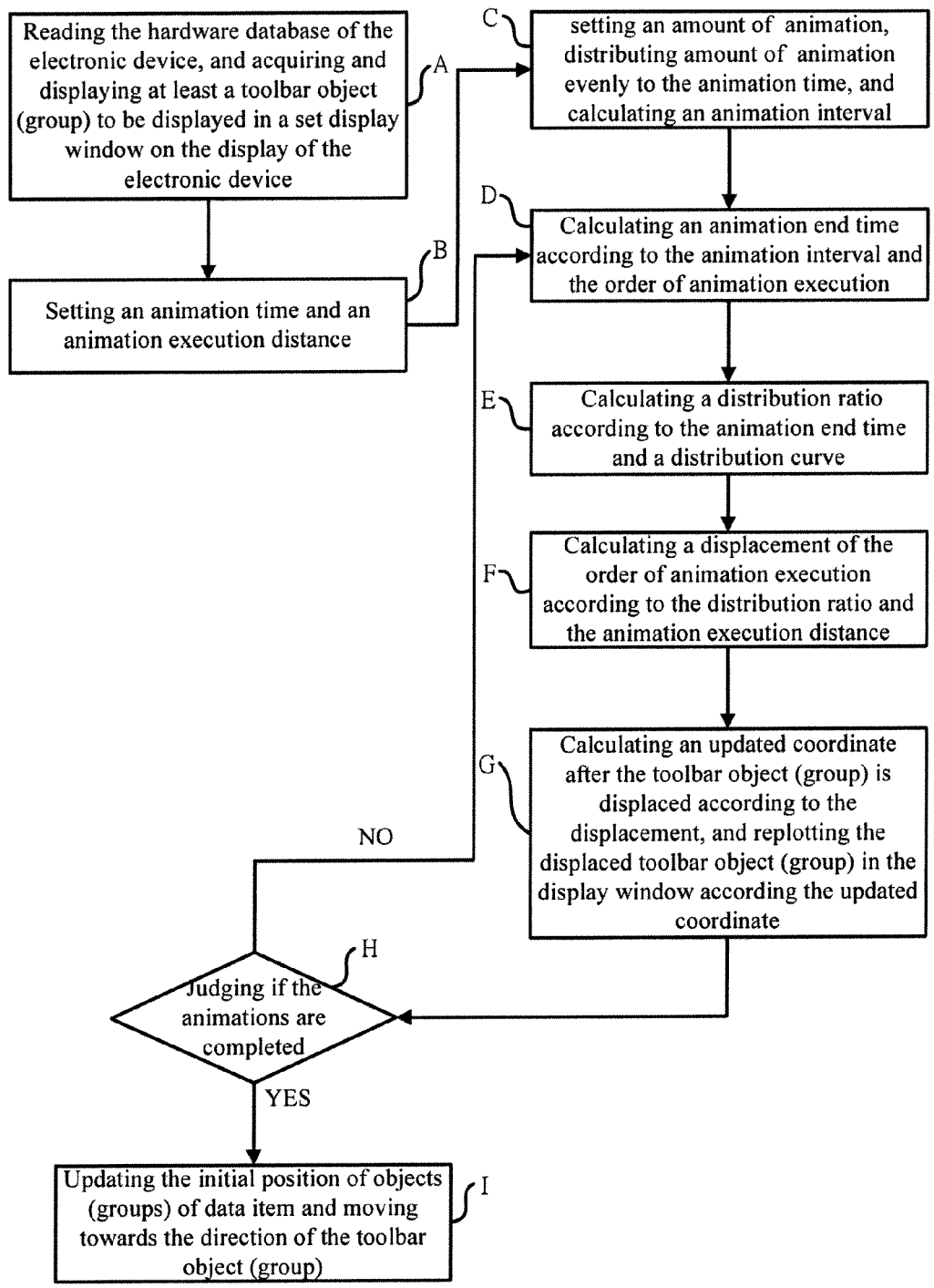
FIGS. 11 to 14 show flowcharts according to another preferred embodiment of the present invention.
Figure 12:
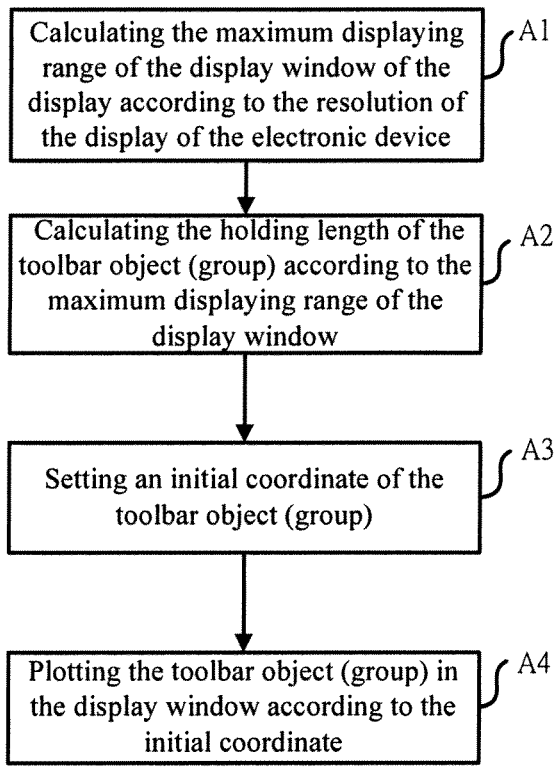

FIG. 11 shows a flowchart according to another preferred embodiment of the present invention. As shown in the figure, the method for displaying displacement of the toolbar object (group) 30 according to the present invention comprises the following steps. First, a step (A) is executed for reading the hardware database of the electronic device, and acquiring and displaying at least a toolbar object (group) 30 to be displayed in a set display window 15 on the display 10 of the electronic device. In detailed process of this step (A) is shown in FIG. 12 and will be elaborated later. According to the present embodiment, when the toolbar object (group) 30 is hidden, it will move to the right side of the display window 15. At this moment, the present invention will display animations with speed variations. The method for displaying is to set an animation time TA and an animation execution distance DA. Because the displacement of the toolbar object (group) 30 is its holding length TW, the holding length TW of the toolbar object (group) 30 is set to be the animation execution distance DA. Then, a step (C) is executed for setting an amount of animation TN, distributing the amount of animation TN evenly to the animation time TA, and calculating an animation interval TS, which is the execution time for each step of animation. Next, a step (D) is executed for calculating an animation end time TDi (i=1~TN) according to the animation interval TS and the order of animation execution, which means that the end time for executing each step of animation is calculated.

After the animation end time TDi is calculated, a step (E) is executed for calculating a distribution ratio Ri (i=1~TN) according to the animation end time TDi and a distribution curve. Afterwards, a step (F) is executed for calculating a displacement DAi (i=1~TN) of the order of animation execution according to the distribution ratio Ri and the animation execution distance DA. This step is to calculate the displacement DAi of different order of animation. Namely, the displacement of each animation is calculated. The displacements differ depending on the speeds of the animations. Then, a step (G) is executed for calculating an updated coordinate after the toolbar object (group) 30 is displaced according to the displacement DAi, and replotting the displaced toolbar object (group) 30 in the display window 15 according the updated coordinate. Thereby, a step of animation is finished.

When the above step (G) is completed, a step (H) is executed for judging if the order the animation execution is equal to the amount of animation TN. If not, the above steps (D) to (H) are repeated for calculating the animation end time TDi (the step D), the distribution ratio Ri (the step E), the displacement DAi (the step F), and the updated coordinate (the step G) of the toolbar object (group) 30 for the next step of animation until the order of animation execution is equal to the amount of animation TN. If it is judged that the animations are completed, because the toolbar object (group) 30 is already hidden, the objects (groups) of data item can be moved towards the direction of the toolbar object (group) for displaying more objects (groups) of data item. As shown in the step (I), the initial position of the first object (group) of data item 20 shown in FIG. 10 is updated. Meanwhile, the updated coordinates of other objects (groups) of data item are re-calculated; the plurality of objects (groups) of data item are replotted in the display window 15 according to the updated coordinates.

FIG. 12 shows a detailed flowchart of the step (A) according to the present invention. When executing the step (A) in FIG. 11 for displaying the read toolbar object (group) 30 in the display window 15, the following steps are executed. A step (A1) is executed for calculating the maximum displaying range of the display window 15 of the display 10 according to the resolution of the display 10 of the electronic device. Then, a step (A2) is executed for calculating the holding length TW (refer to FIG. 10) of the toolbar object (group) 30 according to the maximum displaying range of the display window 15. That is, the range for holding the toolbar object (group) 30 is defined. Next, a step (A3) is executed for setting an initial coordinate of the toolbar object (group) 30 in the display window 15. Finally, a step (A4) is executed for plotting the toolbar object (group) 30 in the display window 15 according to the initial coordinate.

Figure 13:
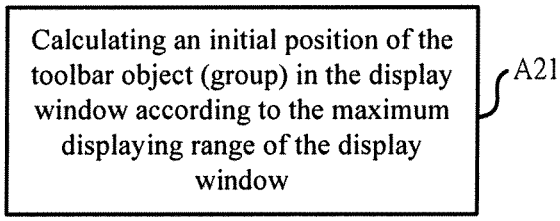

FIG. 13 shows a detailed flowchart of the step (A2) according to the present invention. The step (A2) further comprises a step (A21) for calculating an initial position PS (refer to FIG. 10) of the toolbar object (group) 30 in the display window 15 according to the maximum displaying range of the display window 15. Thereby, the toolbar object (group) 30 will be display at the initial position PS of the display window 15.

Figure 14:
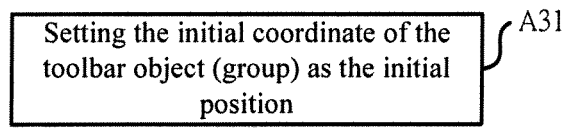

FIG. 14 shows a detailed flowchart of the step (A3) according to the present invention. When the step (A3) in FIG. 12 according to the present invention is executed for setting the initial coordinate of the toolbar object (group) 30, it further comprises a step (A31) for setting the initial coordinate of the toolbar object (group) 30 as the initial position PS, so that the toolbar object (group) 30 can be displayed at the initial position PS of the display window 15.

To sum up, the method for displaying the displacement of an object on the display of an electronic device is used for displaying animations with speed variations when the object (group) is moving. The method for displaying according to the present invention first calculates the displacement of each step of animation. Then, the updated coordinate of the displaced object (group) is calculated according to the displacement, and the displaced object (group) is replotted in the set display window of the display of the electronic device according to the updated coordinate. Thereby, when the object (group) is moving, animated displaying effects with speed variations can be presented. In addition, because the present invention displays the object (group) according to the maximum displaying range of the display window and sets the initial position of the first object (group) displayed in the display window, the objects (groups) is ensured to be displayed completely in the display window. Hence, the user is guaranteed view the complete objects (groups).

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A method for displaying the displacement of an object on the display of an electronic device, comprising steps of:
   (A) reading the hardware database of said electronic device, and acquiring and displaying a plurality of objects (groups) of data item in a set display window on said display of said electronic device;
   (B) calculating the dragging speed at which a user drags said object (group) of data item when said user drags any of said plurality of objects (groups) of data item in said display window;
   (C) setting an animation time, and calculating an animation execution distance according to said dragging speed and said animation time;
   (C1) modifying said animation execution distance according to said holding height of said plurality of objects (groups) of data item and an initial position of the first object (group) of data item;

(D) setting an amount of animation, distributing said amount of animation evenly to said animation time, and calculating an animation interval;

(E) calculating an animation end time according to said animation interval and the order of animation execution;

(F) calculating a distribution ratio according to said animation end time and a distribution curve, said distribution curve being related to the speed changes of the animations;

(G) calculating a displacement of said order of animation execution according to said distribution ratio and said animation execution distance;

(H) calculating an updated coordinate after said plurality of objects (groups) of data item are displaced according to said displacement, and replotting said displaced plurality of objects (groups) of data item in said display window according said updated coordinate; and (I) repeating said steps (E) to (I) until said order of animation execution is equal to said amount of animation.

2. The method for displaying of claim 1, wherein said step (A) comprises steps of:
(A1) calculating the maximum displaying range of said display window of said display according to the resolution of said display of said electronic device;
(A2) calculating the holding height of each of said objects (groups) of data item according to said maximum displaying range;
(A3) calculating a plurality of coordinates of said plurality of objects (groups) of data items according to said holding height; and
(A4) plotting said plurality of objects (groups) of data items in said display window according to said plurality of coordinates.

3. The method for displaying of claim 2, wherein said step (A2) further comprises steps of:
(A21) calculating an initial position of a first object (group) of data item in said display window according to said maximum displaying range of said display window; and
(A22) setting an initial coordinate of said first object (group) of data item as said initial position.

4. The method for displaying of claim 2, wherein said step (A3) further comprises a step (A31) of calculating a plurality of coordinates of the rest of said plurality of objects (groups) of data item according to said initial position of said first object (group) of data item in said displaying window and said holding height.

5. The method for displaying of claim 1, wherein said step (B) further comprises steps of:
(B1) recording an initial position coordinate and an initial time by which said user starts to drag said object (group) of data item in said display window;
(B2) recording an end position coordinate and an end time by which said user stops dragging said object (group) of data item in said display window; and
(B3) calculating said dragging speed at which said user drags said object (group) of data item according to said initial position coordinate, said end position coordinate, said initial time, and said end time.

6. The method for displaying of claim 1, wherein said distribution curve is a normal distribution curve.

7. The method for displaying of claim 1, wherein said display is a touch-panel display.

8. A method for displaying the displacement of an object on the display of an electronic device, comprising steps of:
(A) reading the hardware database of said electronic device, and acquiring and displaying at least a toolbar object (group) to be displayed in a set display window on said display of said electronic device;
(B) setting an animation time and setting a holding length of said toolbar object (group) as an animation execution distance;
(C) setting an amount of animation, distributing said amount of animation evenly to said animation time, and calculating an animation interval;
(D) calculating an animation end time according to said animation interval and the order of animation execution;
(E) calculating a distribution ratio according to said animation end time and a distribution curve, said distribution curve being related to speed changes of said animations;
(F) calculating a displacement of said order of animation execution according to said distribution ratio and said animation execution distance;
(G) calculating an updated coordinate after said toolbar object (group) is displaced according to said displacement, and replotting said displaced toolbar object (group) in said display window according said updated coordinate; and
(H) repeating said steps (D) to (H) until said order of animation execution is equal to said amount of animation.

9. The method for displaying of claim 8, wherein said step (A) comprises steps of:
(A1) calculating the maximum displaying range of said display window of said display according to the resolution of said display of said electronic device;
(A2) calculating the holding length of said toolbar object (group) according to said maximum displaying range of said display window;
(A3) setting an initial coordinate of said toolbar object (group); and
(A4) plotting said toolbar object (group) in said display window according to said initial coordinate.

10. The method for displaying of claim 9, wherein said step (A2) further comprises a step (A21) of calculating an initial position of said toolbar object (group) in said display window according to said maximum displaying range of said display window.

11. The method for displaying of claim 10, wherein said step (A3) further comprises a step (A31) of setting said initial coordinate of said toolbar object (group) as said initial position.

12. The method for displaying of claim 8, wherein said distribution curve is a normal distribution curve.

* * * * *